2 Sheets—Sheet 1.

T. JOSEPH.
COOLING AND VENTILATING MINES, HOUSES, &c.

No. 181,945. Patented Sept. 5, 1876.

Witnesses
G. W. Hutcheson
D. Ellis

Inventor:
Thomas Joseph

N. PETERS, PHOTO-LITHOGRAPHER, WASHINGTON, D. C.

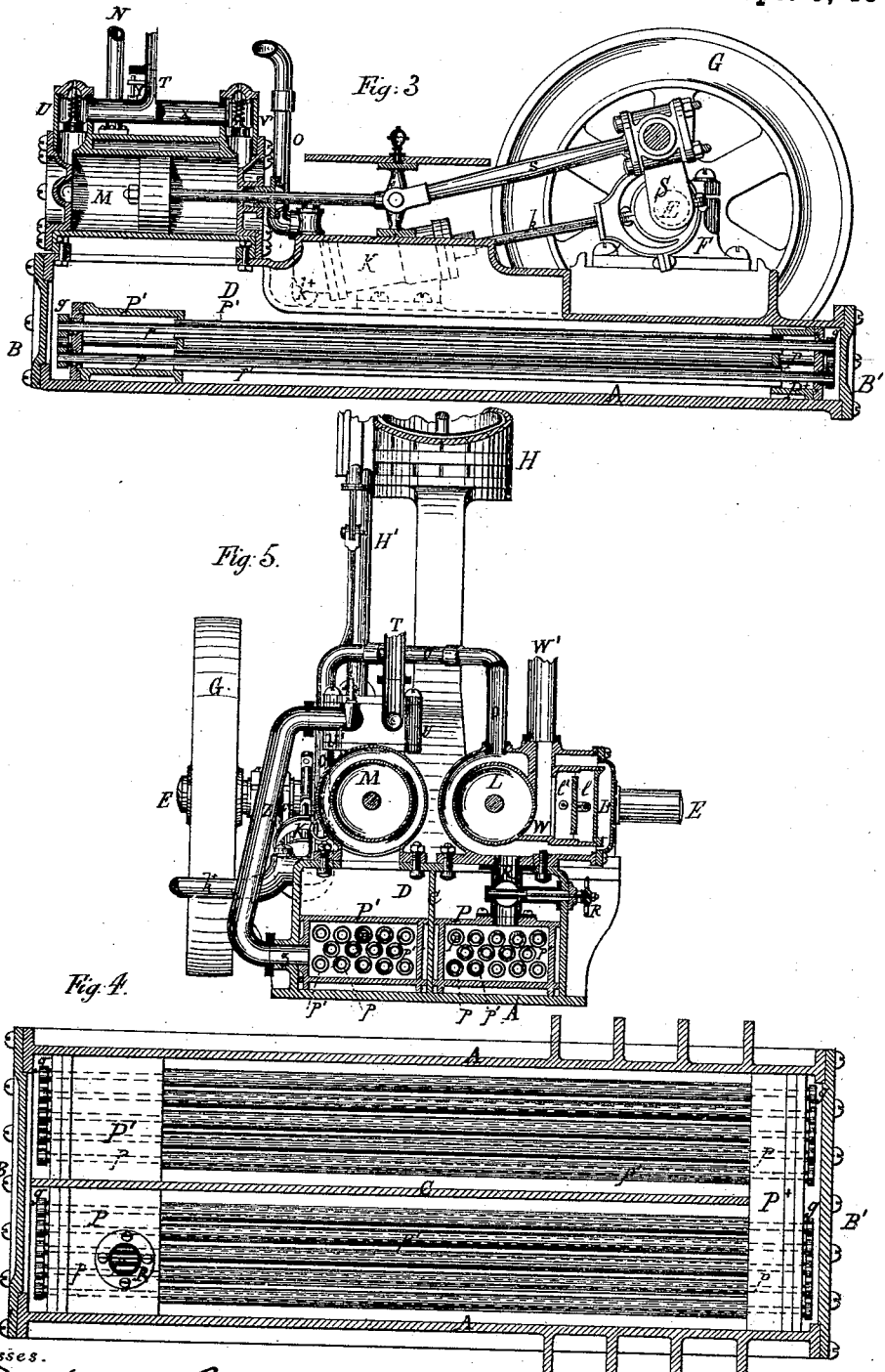

UNITED STATES PATENT OFFICE.

THOMAS JOSEPH, OF TREHERBERT PONTYPRIDD, WALES.

IMPROVEMENT IN COOLING AND VENTILATING MINES, HOUSES, &c.

Specification forming part of Letters Patent No. 181,945, dated September 5, 1876; application filed March 24, 1876.

*To all whom it may concern:*

Be it known that I, THOMAS JOSEPH, of Treherbert Pontypridd, in the county of Glamorgan, in Wales, mining-engineer, have invented a certain new or improved method of cooling and ventilating mines, houses, ships, and other structures, applicable also for abating heat, smoke, and steam in tunnels and other confined places, and in apparatus employed therein, of which the following is a specification:

This invention relates to an improved method of cooling and ventilating, and in apparatus for compressing the air for the purpose, such method and apparatus being also applicable for abating heat, smoke, and steam in confined places by means of the air so compressed, which I discharge into the structure, place, space, part, or thing to be cooled, ventilated, or acted upon.

According to my invention, I accumulate a quantity of air, which I compress by means of the apparatus, and I store it in a receiver, receivers, or chambers, made of iron or other material, like the reservoirs used for storing air when employed as a motive power, and I discharge it through rose-jets, orifices, or outlets, so that it exerts a cooling, purifying, ventilating, or other required effect on the atmospheric, gaseous, vaporous, or aeriform medium or matter in which the same is projected. This may be effected by pumping compressed air from the apparatus into one or more of the storage-receivers until the desired pressure is obtained. The compressed air is then allowed to flow from the receiver into pipes furnished with stop-cocks, and is thence discharged into the place to be cooled or ventilated. Pressure-gages are fitted to the reservoirs, to indicate the pressure therein, and cause as little waste as possible.

Although I do not restrict myself to any particular pressure to which the air is compressed, yet I am of opinion that a pressure of from thirty to forty pounds avoirdupois on the square inch in the reservoir will be found suitable, and indeed ample.

I now proceed to describe an apparatus for compressing the air and supplying it to the reservoirs or storage-receivers; also, the manner of carrying the invention into practical effect.

Figure 1:
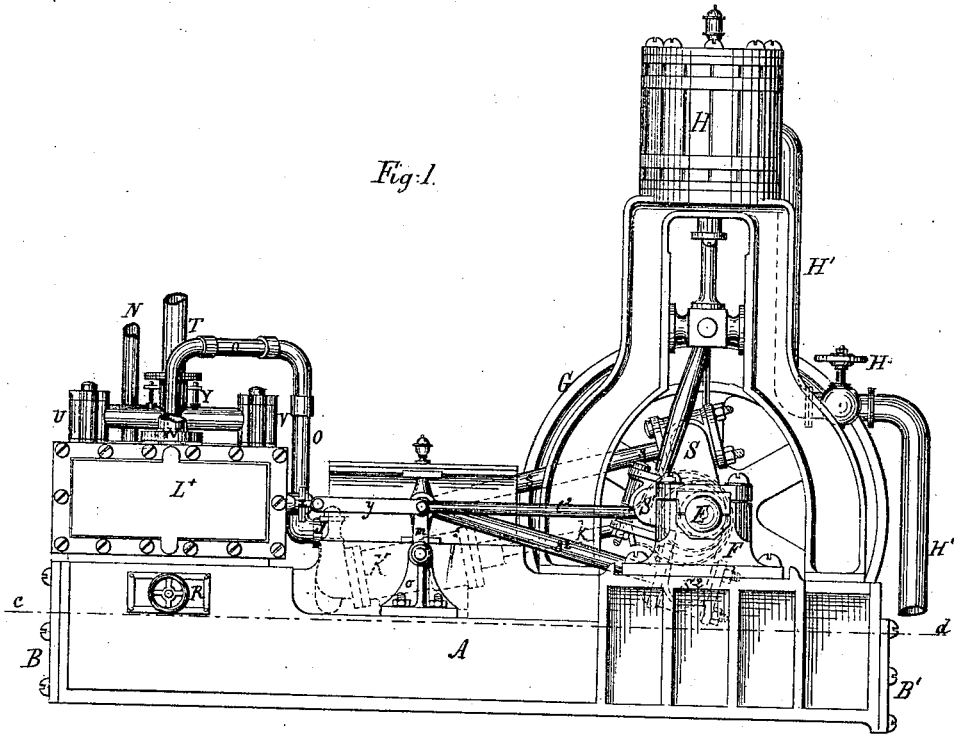
Figure 2:
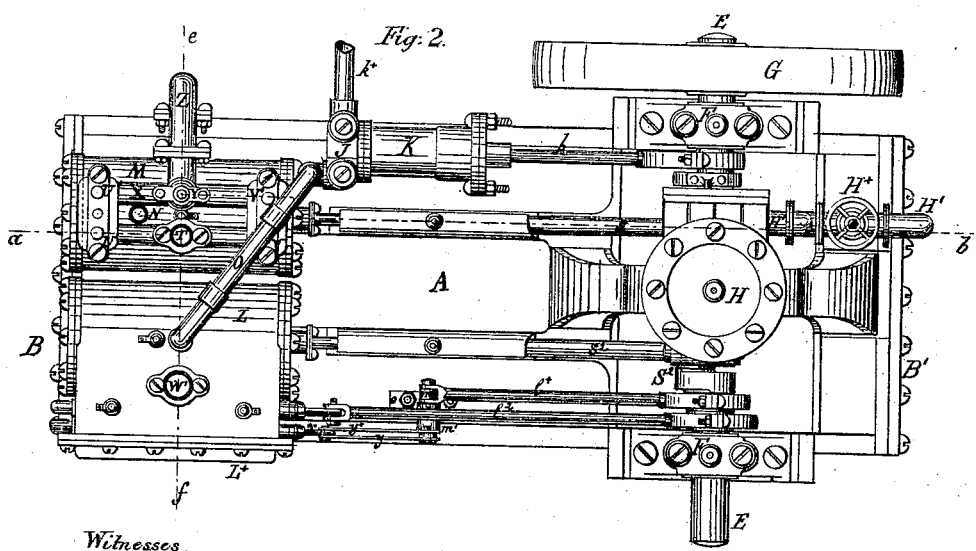

Figure 1 is a side elevation of an apparatus constructed according to the purposes of my invention. Fig. 2 is a plan of the same. Fig. 3 is a longitudinal section taken on the line $a$ $b$ of Fig. 2. Fig. 4 is a horizontal section taken on the line $c$ $d$ of Fig. 1, showing the arrangement of the cooling apparatus; and Fig. 5 is a vertical section taken on the line $e f$ of Fig. 2.

A is the base or foundation, made of the box shape, and provided with a division, C, through its middle, and covers B B' at each end. This division-plate C passes close up to the cover B at the right-hand end, but stops short at the other end, to allow space for the tube-box P$^\times$, and also to permit the passage of water around the tubes.

On the base or foundation A I mount three cranks, S S$^1$ S$^2$, on the shaft E, working in plumber-blocks F, and provided at one end with a fly-wheel, G, driven by steam admitted to the cylinder H through the pipe H', which is opened and closed by means of the valve H$^\times$, to work the crank-shaft, so that as it revolves it works the piston-rod $k$ of a circulating-pump, K, and also the piston-rods of the expanding and compressing or delivery cylinders L and M. This crank-shaft projects far enough on the other side so that another fly-wheel may be fixed thereon, if required.

In the box D I place the cooling apparatus, which consists of two sets of fourteen tubes, P and P'. Each such set is fixed in a separate box at the cylinder end, but communicates in one box at the other end. The tubes are fixed in any ordinary manner, and internal or concentric tubes $p$ pass through them, as shown in the drawings. Each of these internal or concentric tubes has a packed gland, $g$, and is used, in conjunction with the screw-studs, for holding on the box-covers, and for drawing up the boxes on the large tubes.

Nuts and rings are placed at each end of the small tubes, with suitable packing for making the joints.

K is a circulating-pump, which takes its water from the pipe $k^\times$, in connection with a water-main or otherwise, and delivers it through the valve J, and along the pipe O.

The water enters at the top of the expanding or delivery cylinder L, and passes around it and the valve-box L×, and down around the valve R and the right-hand tube-box P.

The water, having passed around the expanding or delivery cylinder L and the valve R, passes up the right-hand-side box P, and through the small tubes $p$, and around the large ones $p'$, to the other end box, P×, and returns in the same manner on the left-hand side, passing around the tubes in the left-hand-side box P', and up around the compressing-cylinder M, and it then leaves the apparatus by a tube, N, at the top of the compressing-cylinder.

The compressing-cylinder is worked by the crank S and connecting-rod $s$. T is a pipe, which is to be led where the purest air can be collected, and the piston of the compressing-cylinder draws the air through the inlet-valves U V at each end, and forces it, when compressed, through the delivery-valves U' and V', and through the pipe X, in connection with the valves U' and V'. Y is a spring safety-valve placed on the pipe X, in connection with the valves V' U', and loaded to whatever pressure it is desired to press the air to.

When the apparatus commences to work, the valve R is closed until the required pressure is obtained.

The cut-off valve $l$ in the expanding-cylinder is adjusted to cut off at the requisite point, so as to give as much compressed air required without reducing the pressure in the expanding or delivery cylinder. The cut-off valve $l$ is worked by the eccentric rod $l^×$, and also by the double crank $m\ m'$, mounted in a support, $o$, and working the valve-rod $x$ by means of the jointed bars $y\ y^×$. The other cut-off valve, $l^1$, is worked by the eccentric rod $l^2$.

The air thus compressed will leave the compressing-cylinder M, and will pass down the pipe Z, entering the cooling apparatus at $z$, as seen in Fig. 5, and it will then enter the left-hand box P', and pass through the tubes $p'$ contained therein, and thence through the tubes contained in the right-hand box P, on which the valve R is fixed. The cooled air thence passes through this valve into the valve-chest L× of the expanding-cylinder L, and through the valves $l\ l^1$ therein. After the expansion it passes through the exhaust-port W, and through the pipe W' into the reservoirs for use.

When the invention is applied to the cooling of the interior of mines, the reservoir is fixed down in the mine, but not far from what is known to miners as the "pit's eye" or bottom of the shaft. The compressed air is conveyed from the apparatus to the reservoir by means of the pipe W', and thence from the reservoir along the traveling roads, and into the entrance of the working-places through other pipes. These pipes are laid upon a bed, surface, support, or foundation of turf or other like yielding or elastic material, and orifices or perforations are formed in them at any convenient intervals or distances apart. These orifices or perforations may be provided with valves, stop-cocks, or movable plugs or rose-spreaders or perforated shields, so that the required quantity of cold compressed air may be ejected or discharged from the pipes into the desired part of the mine, roadways, or working-places.

When my invention is applied to steam-vessels and other floating vessels, the reservoir or chamber for the compressed air is fixed in the hold of the vessel, or other convenient place, so as to suit the build and arrangements of the vessel, and pipes lead from this reservoir, and are so placed and fitted as to carry therefrom the compressed air into the compartments, chambers, engine-rooms, berths, boilers, ranges, cabins, saloons, and other parts of or spaces in such vessels by means of distributing-orifices, as above described.

When the invention is applied to houses or other buildings or structures on land it is most convenient, when possible, to place the reservoir and its machinery and appurtenances below the level of the surface of the ground, excepting, of course, the conveying or delivery pipes or conduits, with their discharge or distributing appliances, as such pipes or conduits must, of course, be carried to and disposed at the required parts of the house, building, or structure.

The pipes are to be laid throughout all the structures and places to be cooled or ventilated, through or along the walls, partitions, floors, or ceilings, in a manner similar to that adopted for laying gas-pipes, and the discharge pipes or jets are often conveniently so disposed as to enter or project into rooms and closed places at about one-tenth of the height of such rooms beneath the ceiling or the roof or top thereof.

The mode of applying the invention to steamers or other vessels may be also adopted for hospitals, law-courts, factories, and other buildings on land liable to become overheated or inconveniently heated.

Rooms or other confined places into which compressed air is discharged according to this invention should be provided with ventilators of any ordinary and convenient construction fitted in the ceiling, cornices, or other suitable part, for the escape of hot or impure air, and for restoring the atmosphere to its normal pressure.

The invention may be applied to tunnels in the same manner as I have described its application to mines, excepting that, in some instances, it is advantageous to attach or dispose the longitudinal perforated pipes, whereby the compressed air is distributed, under the crown of the arch or along the highest level within such tunnel.

In applying the invention to railway and other carriages, especially when used in hot climates, the seats or seat-spaces are made hollow down to the floor of the carriage, so that they consist of or are fitted with hollow chambers. Before the carriage is started these chambers are charged with compressed air from the apparatus. One or more pipes of very small bore or sectional area are carried up therefrom along the angles of the seat-backs, and open into a hollow or tubular perforated bar laid horizontally across the carriage, under the roof, to which it is fitted, and extends over the back of each row of seats, and the cold air escapes therefrom.

The above explanations suffice for showing how the invention may be carried into effect for structures, places, and purposes other than those mentioned.

Having thus fully described the invention, what I claim as new, and desire to secure by Letters Patent, is—

1. The method herein described of ventilating mines, &c., the same consisting in compressing air in a receiver or receivers, and then allowing the air to discharge through suitable outlets on the atmospheric gases or matter to be purified, substantially as described.

2. The improved cooling apparatus P P' $p\,p'$, in which the compressed air is cooled by means of water constantly circulating around the internal tubes $p'$, in which compressed air passes, in the manner described.

THOMAS JOSEPH.

Witnesses:
 J. D. HUTCHESON,
  *Physician and Surgeon.*
 DD. ELLIS,
  *Accountant, Treherbert.*